(12) United States Patent
Trammell et al.

(10) Patent No.: US 11,758,882 B2
(45) Date of Patent: Sep. 19, 2023

(54) DOG VEST

(71) Applicant: Bass Pro Intellectual Property, L.L.C, Springfield, MO (US)

(72) Inventors: Chelsea Ann Trammell, Ozark, MO (US); Edward Arnold Larson, Marshfield, MO (US)

(73) Assignee: BASS PRO INTELLECTUAL PROPERTY, L.L.C., Springfield, MO (US)

(*) Notice: Subject to any disclaimer, the term of this patent is extended or adjusted under 35 U.S.C. 154(b) by 36 days.

(21) Appl. No.: 17/356,949

(22) Filed: Jun. 24, 2021

(65) Prior Publication Data
US 2022/0408693 A1 Dec. 29, 2022

(51) Int. Cl.
*A01K 13/00* (2006.01)

(52) U.S. Cl.
CPC .................... *A01K 13/006* (2013.01)

(58) Field of Classification Search
CPC .................................................. A01K 13/006
See application file for complete search history.

(56) References Cited

U.S. PATENT DOCUMENTS

| | | | |
|---|---|---|---|
| 6,138,611 A * | 10/2000 | Thielemann | A01K 13/006 54/79.1 |
| D908,981 S | 1/2021 | Guo | |
| D931,553 S | 9/2021 | Yu | |
| 2018/0303068 A1* | 10/2018 | Chen | A01K 27/006 |
| 2019/0200572 A1* | 7/2019 | Criswell | A01K 13/006 |
| 2020/0100469 A1* | 4/2020 | Elam | A01K 27/008 |
| 2020/0375147 A1* | 12/2020 | Ohanian | A01K 27/002 |
| 2020/0404887 A1* | 12/2020 | Akenhead | A01K 1/0263 |
| 2021/0015076 A1* | 1/2021 | Ebarb | A01K 13/006 |
| 2022/0087219 A1* | 3/2022 | Higdon | A01K 13/006 |

OTHER PUBLICATIONS

Brochure for VERSAVEST, www.momarsh.com, 1 page.

* cited by examiner

*Primary Examiner* — Monica L Perry
*Assistant Examiner* — Edgar Reyes
(74) *Attorney, Agent, or Firm* — King & Spalding LLP (57) ABSTRACT

A dog vest has a back piece configured for covering at least a portion of the dog's back and sides, and a front piece configured for covering at least a portion of the dog's chest and belly. The back piece has left and right side panels for covering at least a portion of the dog's left and right sides, each of the side panels having a forward hinged flap and rearward hinged flaps overlying the forward and rearward portions of the side panel, respectively. The front piece has left and right forward straps, the free ends of which are adapted to be releasably engaged between a forward flaps and its respective side panels, and left and right rearward tabs, adapted to be releasably engaged between a rearward flap and its respective side panel.

13 Claims, 15 Drawing Sheets

DOG VEST

FIELD

The present disclosure relates to dog vests, and in particular for vests for keeping dogs comfortable while hunting, tracking, and retrieving.

BACKGROUND

This section provides background information related to the present disclosure which is not necessarily prior art.

Various types of coats and vests have been made for dogs, but in general these have been either difficult to adjust to the size and shape of a particular dog and/or they have been difficult to put on and take off. Even where multiple sizes of vests are provided, some adjustment is still needed, in addition to the inconvenience of making and stocking multiple sizes of vests.

SUMMARY

This section provides a general summary of the disclosure, and is not a comprehensive disclosure of its full scope or all of its features.

Various embodiments of this disclosure provide dog vests that are readily adjusted to the particular size and shape of the dog, provide improved comfort for the dog, and/or can be put on and taken off relatively quickly and easily. Generally, a preferred embodiment of a dog vest according to this disclosure comprises a back piece configured for covering at least a portion of the dog's back, and a front piece configured for covering at least a portion of the dog's chest and belly.

The back piece includes left and right side panels for covering at least a portion of the dog's left and right sides. Each of the left and right side panels preferably has a hinged forward flap overlying a forward portion of the side panel, and a rearward hinged flap overlying a rearward portion of the side panel. The underside of each of these flaps and the portion of the side panel it overlies preferably have mating halves of a hook-and-loop-type fastening material to releasably secure the flap over its respective portion of its respective side panel.

The front piece has left and right forward straps, the free ends of which are adapted to be releasably engaged between the forward flap and the underlying portion of the side panel of the left and right side panels, respectively. The front piece also has left and right rearward tabs, the free ends of which are adapted to be releasably engaged between the rearward flap and the underlying portion of the side panel on the left and right side panels respectively.

In some embodiments, the back piece comprises left and right sections releasably joined along a centerline extending parallel to the dog's spine, the left and right sections forming the left and right panels, respectively.

In some embodiments, the portion of the ends of the left and right forward straps facing the side panel under the forward flaps can have the mating half of the hook-and-loop-type fastening material that is on the side panel under the forward flaps to releasably engage the left and right side panels, respectively. Similarly, the portion of the ends of the left and right forward straps facing the underside of the forward flaps can have the mating half of the hook-and-loop-type fastening material that is on the underside of the forward flap to releasably engage the underside of the forward flaps on left and right side panels, respectively.

In some embodiments, the portion of the ends of the left and right rearward tabs facing the side panel under the rearward flaps have the mating half of the hook-and-loop-type fastening material that is on the side panel under the rearward flap to releasably engage the left and right side panels, respectively. Similarly, the portion of the ends of the left and right tabs facing the underside of the rearward flaps have the mating half of the hook-and-loop-type fastening material on the underside of the rearward flaps to releasably engage the rearward flaps on left and right side panels, respectively.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Generally, a preferred embodiment of a dog vest according to this disclosure indicated generally as 20 in the Figures comprises a back piece 22 configured for covering at least a portion of a dog's back, and a front piece 24 configured for covering at least a portion of a dog's chest and belly.

The back piece 22 includes left and right side panels 26 and 28 for covering at least a portion of the dog's left and right sides. Each of the left and right side panels 26, 28 preferably has a forward hinged flap 30 and 32 overlying a forward portion of its respective side panel. Each of the left and right side panels 26, 28 preferably also has a rearward hinged flap 34 and 36, overlying a rearward portion of its respective side panel. The underside of each of these flaps 30, 32, 34, and 36 and the portion of the side panel it overlies preferably have mating halves of a hook-and-loop-type fastening material, such as Velcro™, to releasably secure the flap over its respective portion of its respective side panel. For example, the outwardly facing portions of the side panels can be provided with the hook portion of the hook-and-loop-type fastening material, and the underside of the flaps 30, 32, 34, and 36 can be provided with the loop portion of the hook-and-loop-type fastening material (or vice versa).

The back piece 22 can be made of Neoprene and 900D polyester, or other suitable materials. The flaps 30, 32, 34, and 36 can be made of similar materials, and can be printed or otherwise provided with camouflage pattern, or other decorative or functional patterns.

The front piece 24 has left and right forward straps 38 and 40, the free ends of which are adapted to be releasably engaged between the forward flaps 30, 32 and their respective underlying portions of the left and right side panels 26 and 28. The front piece 24 also has left and right rearward tabs 42 and 44, the free ends of which are adapted to be releasably engaged between the rearward flaps 34 and 36 and their respective underlying portions of the left and right side panels 26 and 28.

The front piece 24 can be made of Neoprene and Kevlar, or other suitable materials.

In some embodiments, the back piece 24 comprises left and right sections 46 and 48 releasably joined along a centerline 50 extending parallel to the dog's spine. The left and right sections 46 and 48 form the left and right panels 26 and 28, respectively. For example, the left and right sections 46 and 48 can be joined by a zipper 52, which allows the sections to be quickly and easily connected and disconnected. Of course, some other attachment means can be used. One of the sections can overlap the zipper 52 on the underside of the back piece to protect the dog from the zipper.

In some embodiments the portions 54 and 56 of the ends of the left and right forward straps 38 and 40 facing the side panels under the forward flaps 30 and 32 can have the mating half of the hook-and-loop-type fastening material that is on the side panel to releasably engage the left and right side panels under the forward flaps, respectively. Similarly, the portions 58 and 60 of the ends of the left and right forward straps 38 and 40 facing the underside of the forward hinged flaps 30 and 32 can have the mating half of the hook-and-loop-type fastening material that is on the underside of the forward flap to releasably engage the underside of the forward flaps on left and right side panels 26 and 28, respectively. For example, the portions 54 and 56 of the ends of the left and right forward straps 38 and 40 facing the side panels under the forward flaps 30 and 32 have the loop portions of the hook-and-loop-type fastening material to engage the hook portion of the hook-and-loop fastening material that is preferably on the side panels, and the portions 58 and 60 of the ends of the left and right forward straps 38 and 40 facing the underside of the forward hinged flaps 30 and 32 can have the hook portion of the hook-and-loop-type fastening material to engaging the loop portion of the hook-and-loop-type fastening material that is preferably on the underside of the forward flaps.

In some embodiments the portions 62 and 64 of the ends of the left and right rearward tabs 42 and 44 facing the side panels have the mating half of the hook-and-loop-type fastening material that is on the side panels to releasably engage the left and right side panels 26 and 28, respectively. Similarly, the portions 66 and 68 of the ends of the left and right rearward tabs 42 and 44 facing the underside of the rearward flaps 34 and 36 have the mating half of the hook-and-loop-type fastening material on the underside of the rearward flaps to releasably engage the rearward flaps on left and right side panels, 26 and 28 respectively. For example, the portions 62 and 64 of the ends of the left and right rearward tabs 42 and 44 facing the side panels under the rearward flaps 34 and 36 have the loop portions of the hook-and-loop-type fastening material to engage the hook portion of the hook-and-loop fastening material that is preferably on the side panels, and the portions 66 and 68 of the ends of the left and right rearward tabs 42 and 44 facing the underside of the rearward hinged flaps 34 and 36 can have the hook portion of the hook-and-loop-type fastening material to engaging the loop portion of the hook-and-loop-type fastening material that is preferably on the underside of the rearward flaps.

The back piece 22 has a forward edge 70 on the left side and right side panels, and the forward flaps 30 and 32 preferably are hinged adjacent to and parallel with the forward edges of their respective sides of the back piece. The rearward flaps on the left and right side panels preferably are hingedly mounted to the back piece 22 parallel to centerline between the left and right sections.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Figure 9:
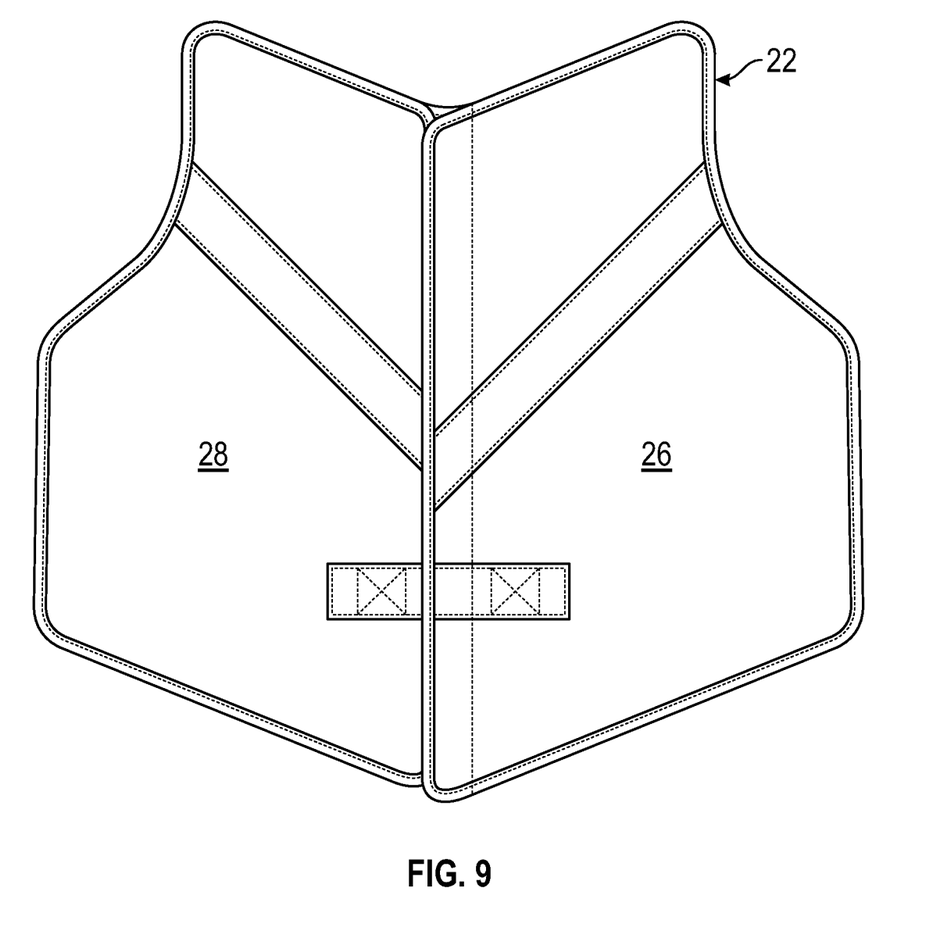
FIG. 9 is a bottom plan view of the back piece.
Figure 10:
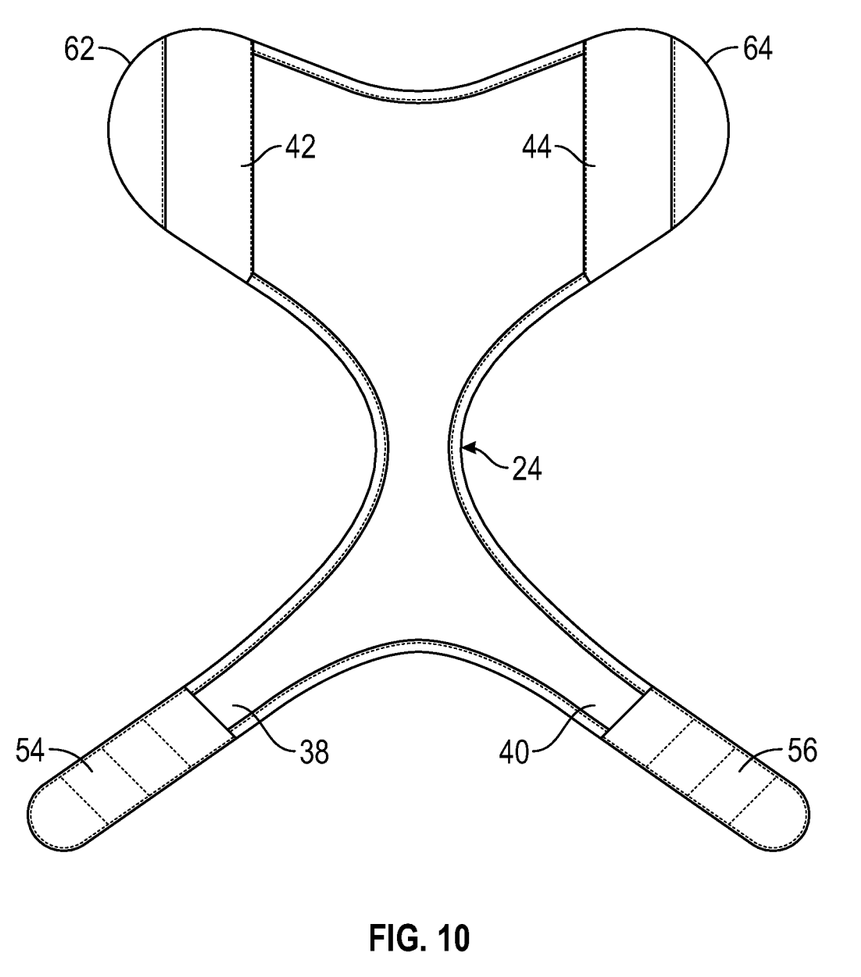
FIG. 10 is a top plan view of the front piece.
Figure 11:
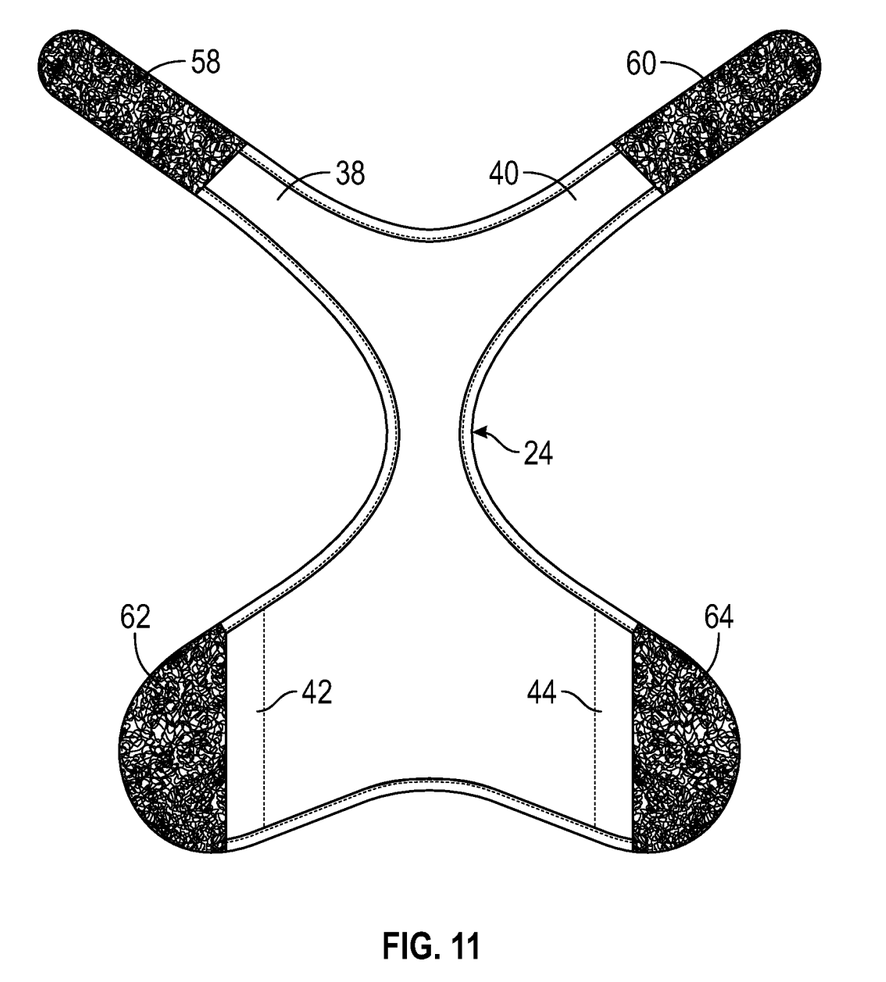
FIG. 11 is a bottom plan view of the front piece.
Figure 12:
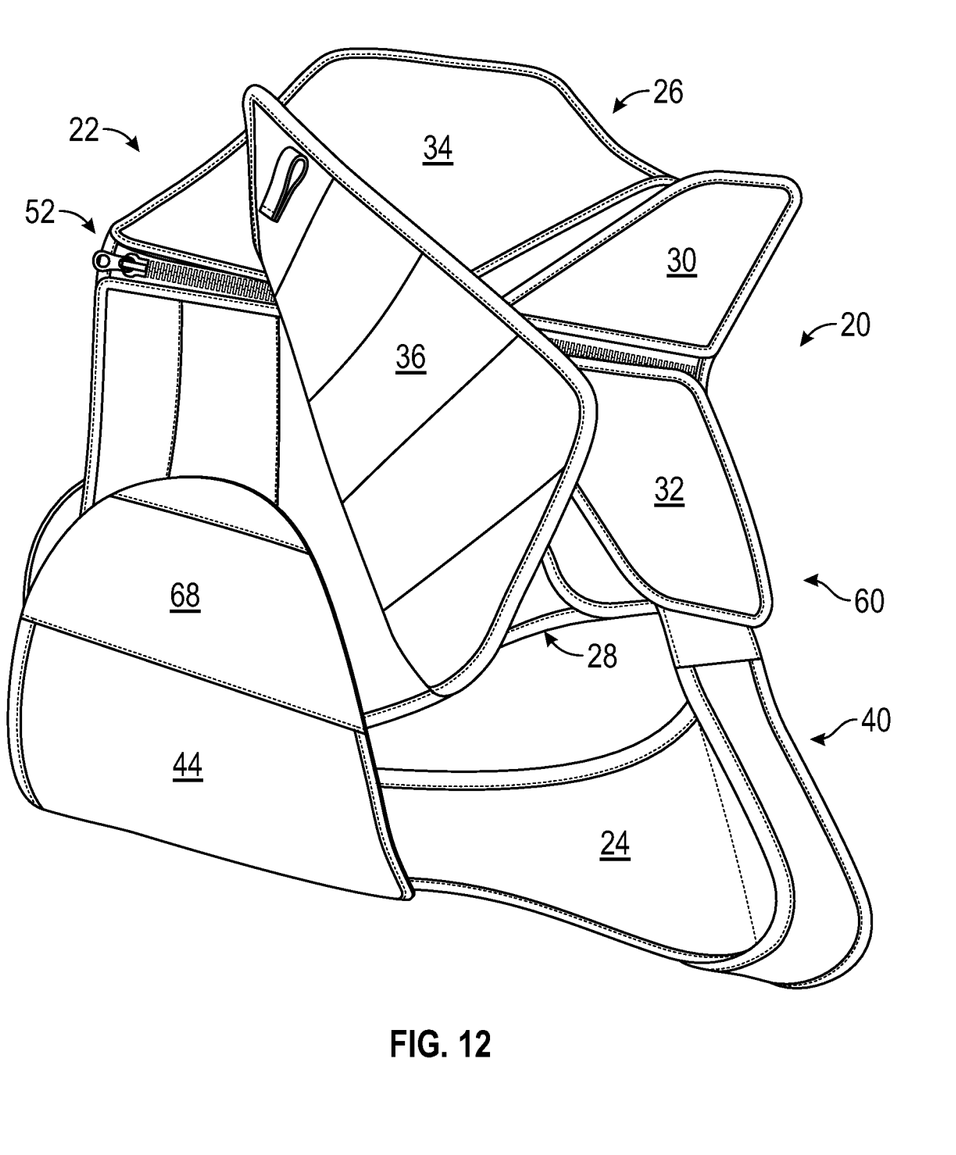
FIG. 12 is a perspective view showing the attachment of a forward strap on the front piece to the back piece.
Figure 13:
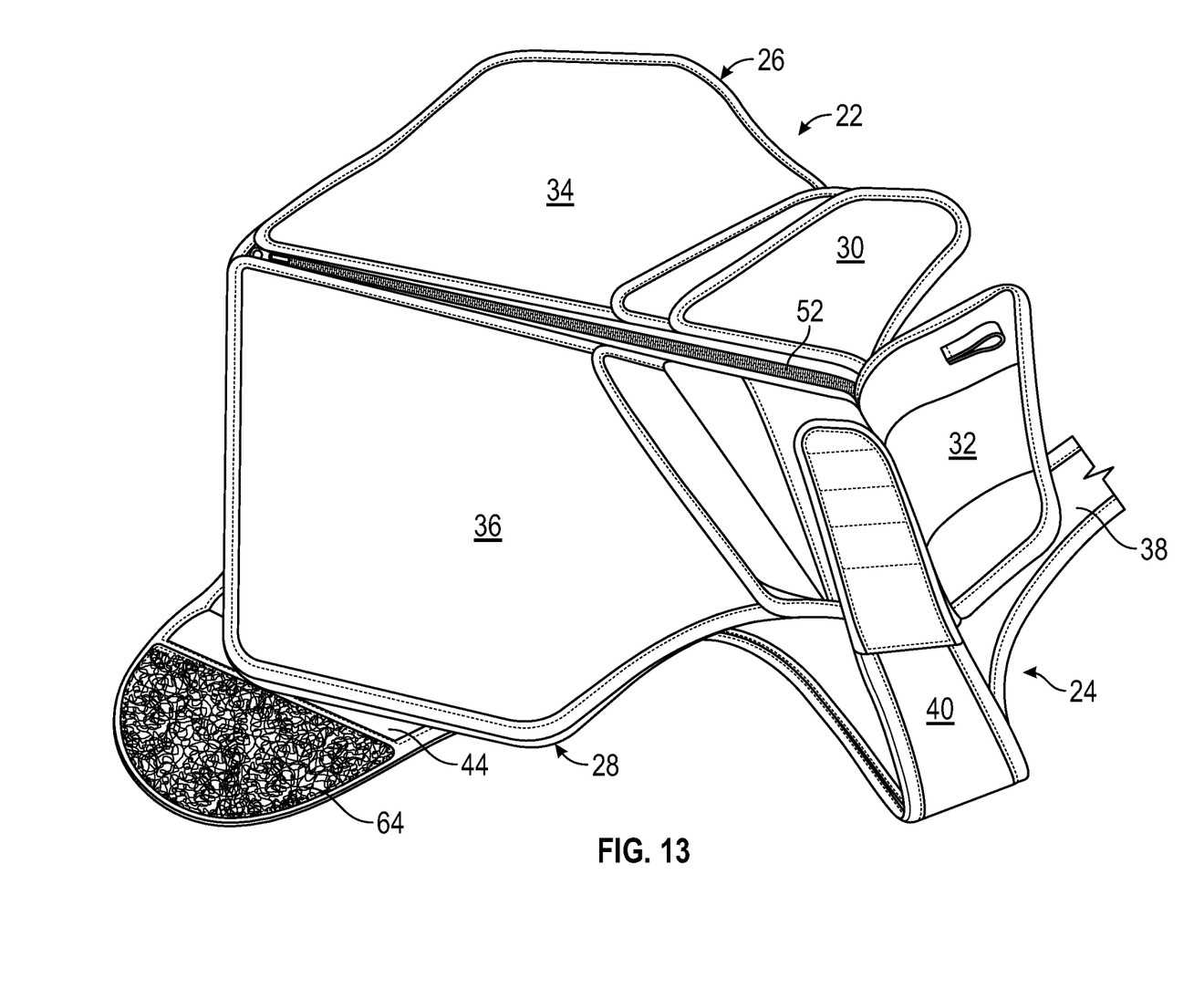
FIG. 13 is a perspective view showing the attachment of a rearward tab on the front piece to the back piece.
Figure 14:
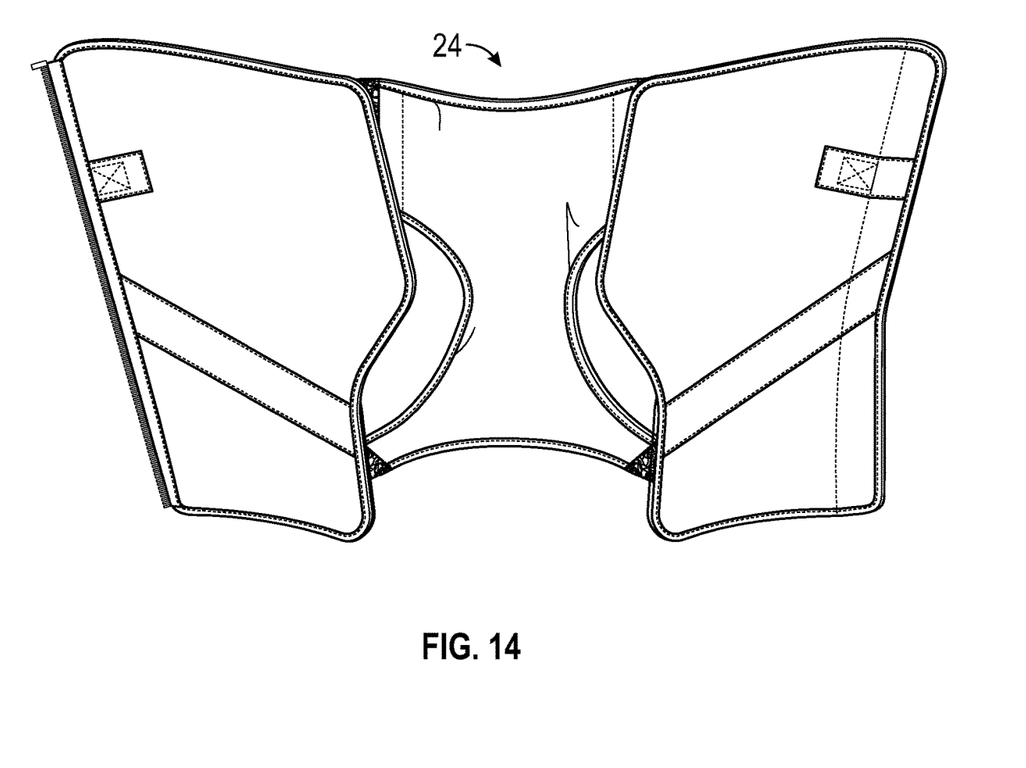
FIG. 14 is a perspective view showing the separation of the sections of the back piece to facilitate putting on and taking off the vest.

As shown FIG. 9, a portion of the side 26 can overlap a portion of the side 28 (or vice versa) to cover the zipper 50 so that it does not rub on the dog's back, or catch the dog's hair.

Figure 1:
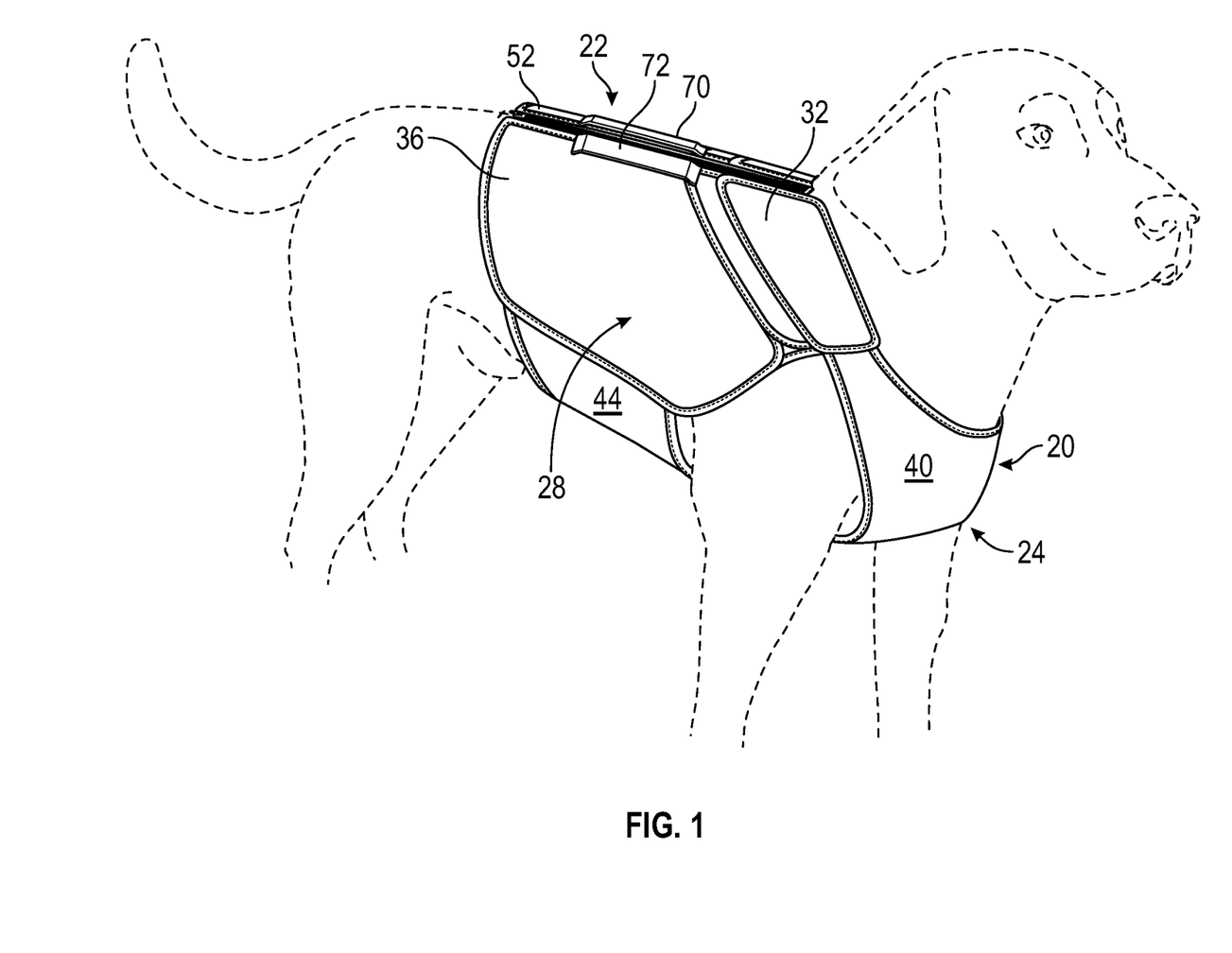
FIG. 1 is a perspective view of a preferred embodiment of a dog vest constructed according to the principles of this invention, shown as it would be worn by a dog.
Figure 2:
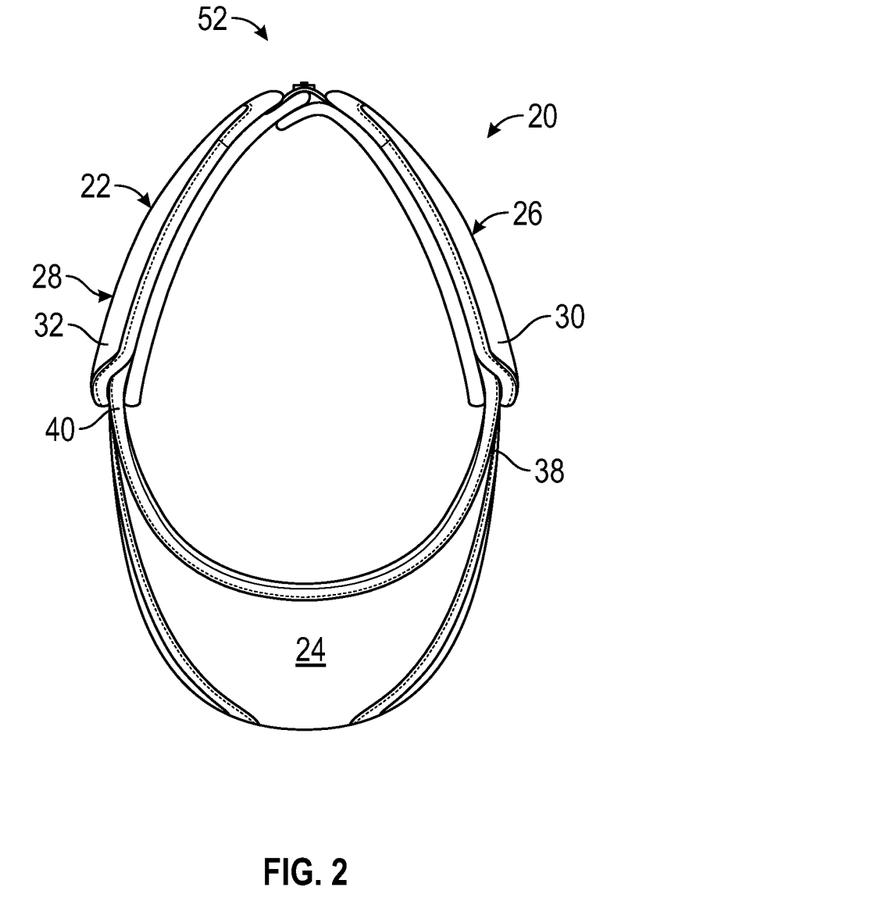
FIG. 2 is a front elevation view of the vest.
Figure 3:
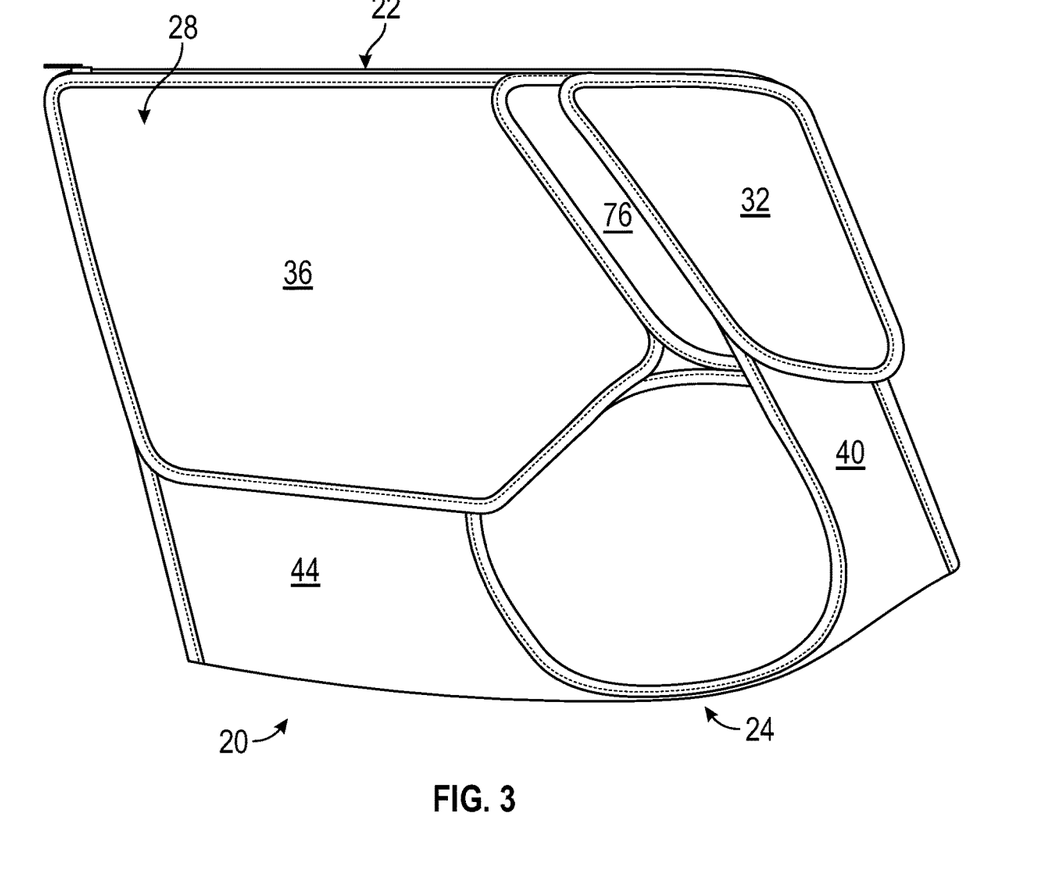
FIG. 3 is a left side elevation view of the vest.
Figure 4:
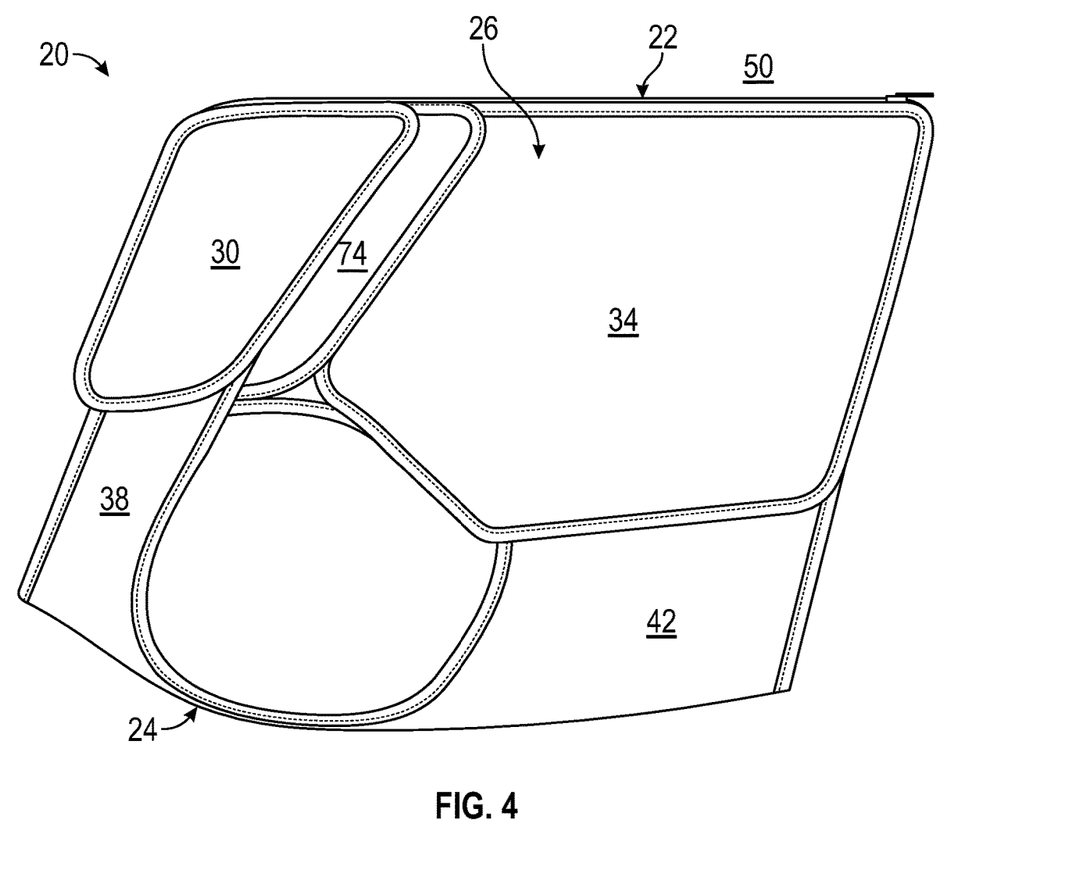
FIG. 4 is a right side elevation view of the vest.
Figure 5:
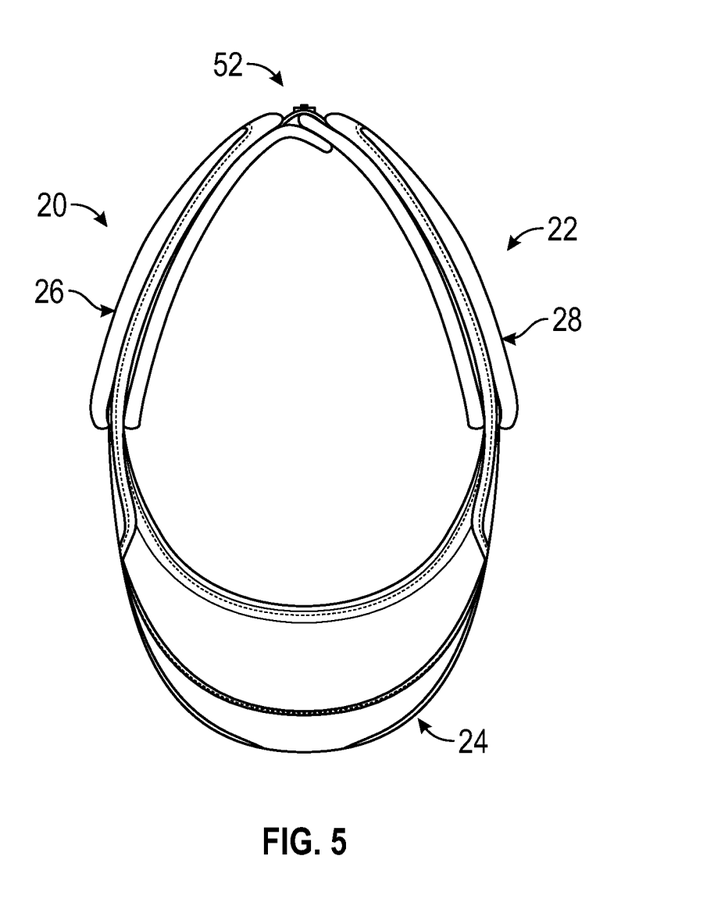
FIG. 5 is a rear elevation view of the vest.
Figure 6:
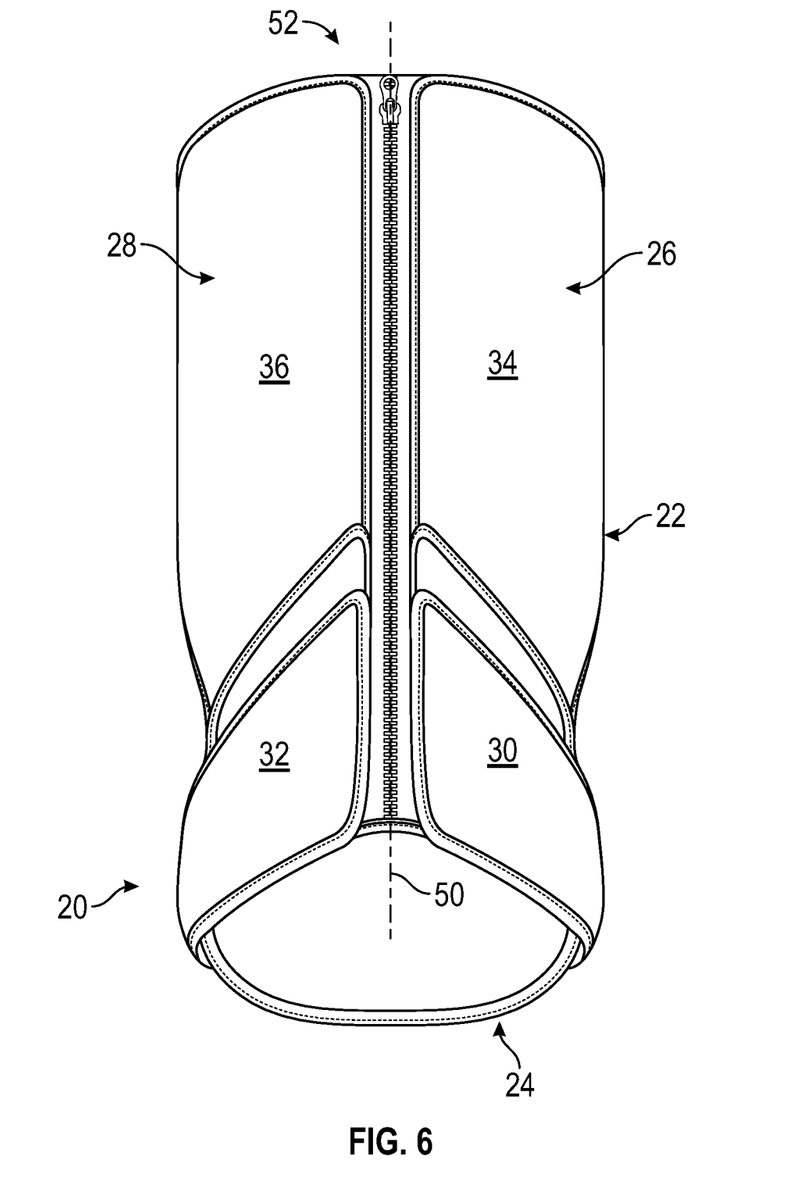
FIG. 6 is a top plan view of the vest.
Figure 7:
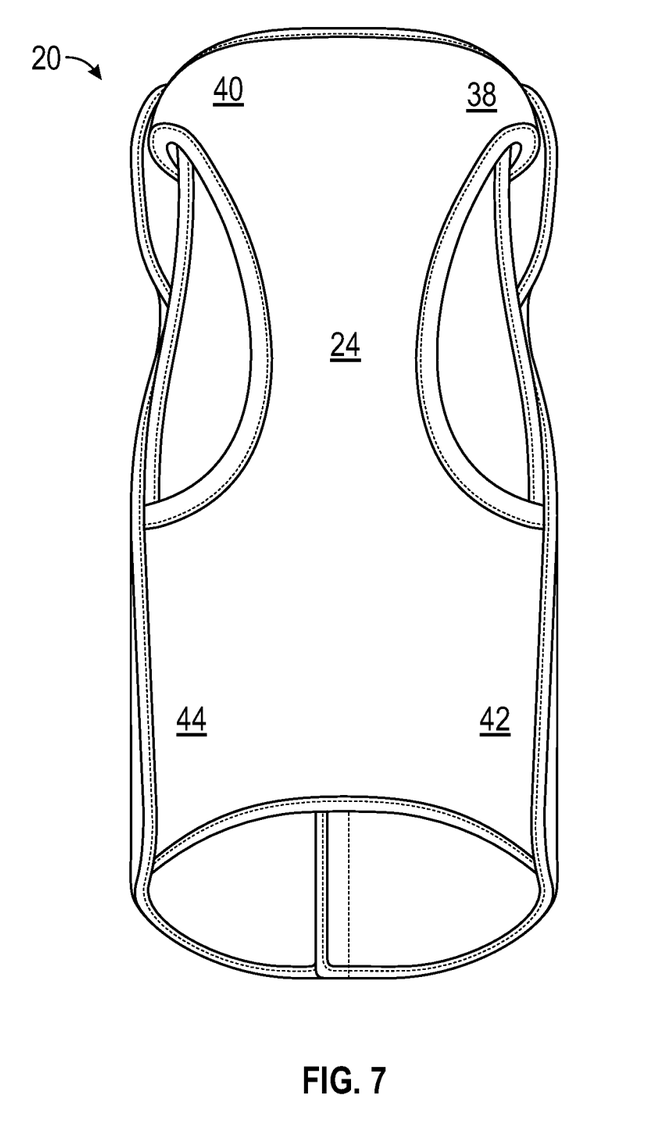
FIG. 7 is a bottom plane view of the vest.
Figure 8:
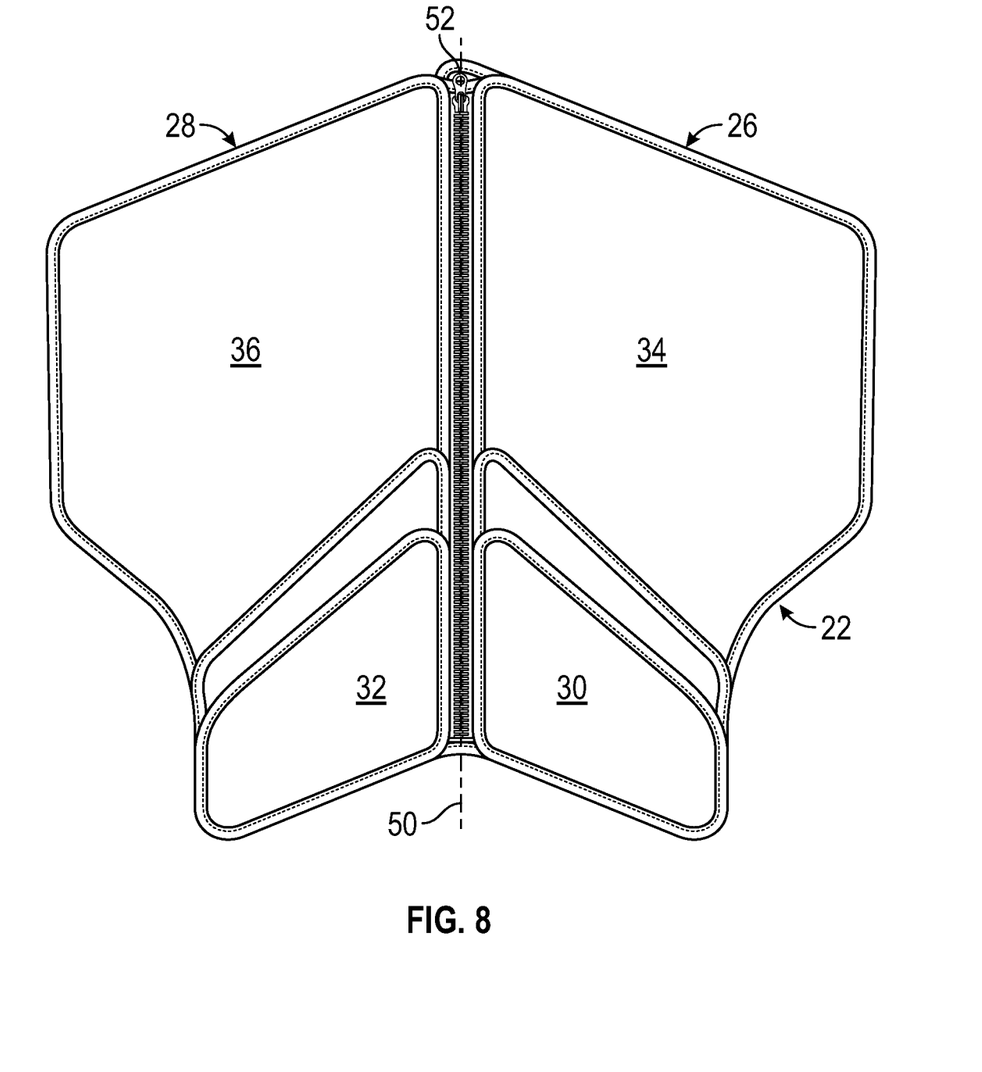
FIG. 8 is a top plan view of the back piece.
Figure 8A:
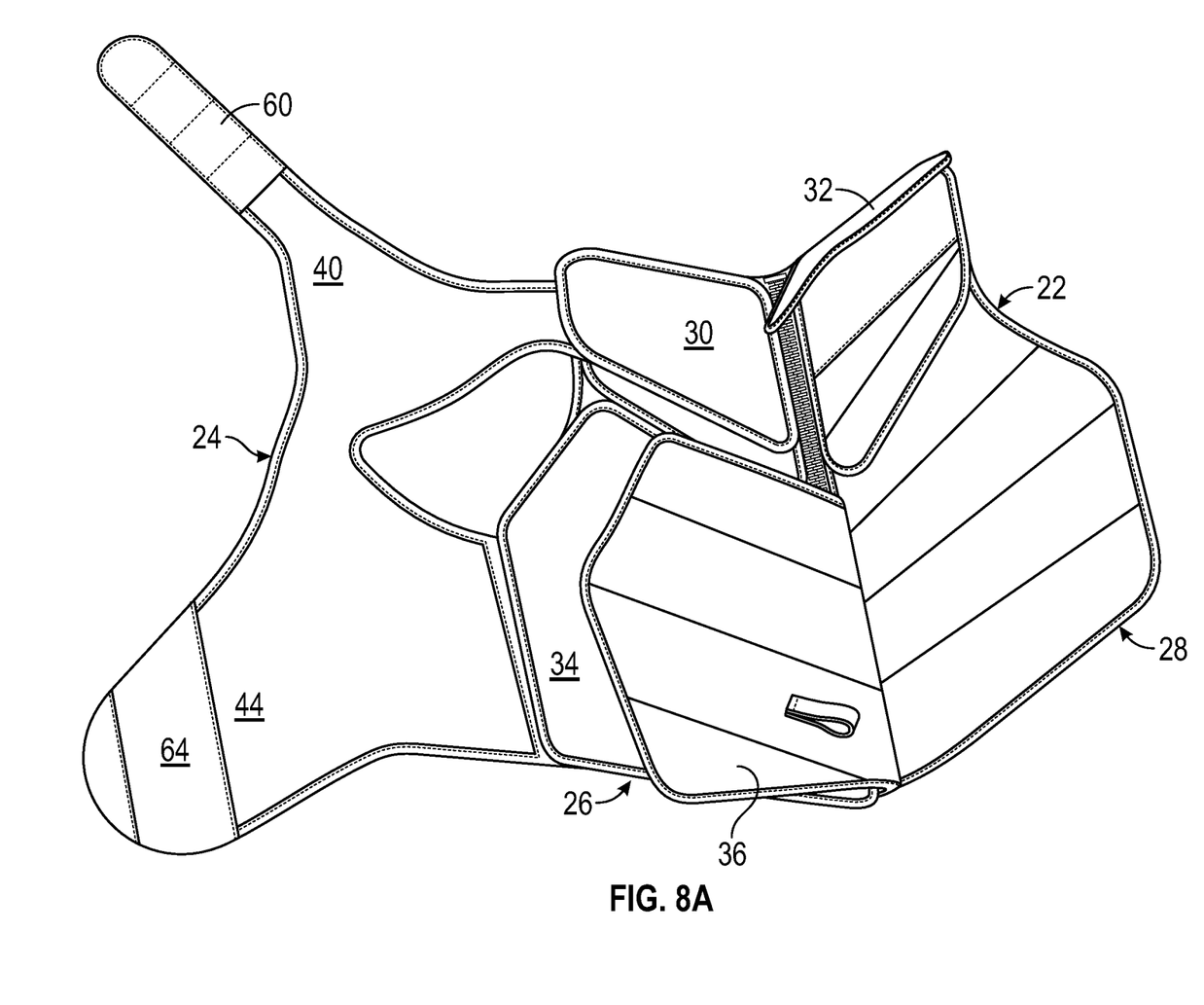
FIG. 8A is a top plan view of the back piece with the forward and rearward flaps on the right side lifted.

As shown in FIG. 1 handles 70 and 72 can be secured on the sides 26 and 28 to be able to manipulate a dog wearing the vest 20, for example lowering the dog into, and lifting the dog from, the water. As shown in FIGS. 3 and 4, segments 74 and 76 can be secured on the left and right side panels 26 and 28, between the forward flap and the rearward flap on each side. Each of the segments 74 and 76 is secured on its respective side, between the forward flap and the rearward flap to form a pocket that can be used as a handle to grasp the vest (and thus the dog wearing the vest).

Operation

In operation, the dog vest 20 is assembled around the dog by placing the back piece 22 over the dogs back. The front piece 24 is then attached to the back piece 22, by engaging the forward straps 38 and 40 and the rearward tabs 42 and 44 to the side panels. In particular the left forward strap 38 is engaged to the left side panel by lifting the left forward flap 30 and engaging the hook and loop fastening material on the portion 54 to the mating portion the hook and loop fastening material on the left side panel, and then pressing down the left forward flap to similarly engage the flap and the portion 58 on the left forward strap. The right forward strap 40 is engaged to the right side panel by lifting the right forward flap 32 and engaging the hook and loop fastening material on the portion 56 to the mating portion the hook and loop fastening material on the right side panel, and then pressing down the right forward flap to similarly engage the flap and the portion 60 on the right forward strap. The front edge of the back piece 22 and the forward straps cooperate to snugly but comfortably surround the dog's neck.

The left rearward tab 42 is engaged to the left side panel by lifting the left rearward flap 34 and engaging the hook and loop fastening material on the portion 62 to the mating portion the hook and loop fastening material on the left side panel, and then pressing down the left rearward flap to similarly engage the flap and the portion 66 on the left rearward tab. The right rearward tab 44 is engaged to the right side panel by lifting the right rearward flap 36 and engaging the hook and loop fastening material on the portion 64 to the mating portion the hook and loop fastening material on the right side panel, and then pressing down the right rearward flap to similarly engage the flap and the portion 68 on the right rearward tab. The back piece 22 and the forward straps 38 and 40 and the rearward tabs 42 and 44 cooperate to snugly but comfortably surround the dog's front legs and secure the vest on the dog.

The fit of the vest is customized to the dog by interatively adjusting the forward straps 38 and 40 and the rearward tabs 42 and 44 to achieve a comfortable fit.

To remove the vest, the zipper 52 can simply be operated to separate the left and right sections 46 and 48 of the back piece 22, and the dog can simply step out of the vest. To thereafter put the vest 20 on the dog, the dog simply steps into the vest, with its front legs aligned with the leg openings and the vest is lifted around the dog, and secured by connecting the left and right sections of the back piece 22 with the zipper 52. Thus the forward straps and rearward tabs only have to be used when the fit of the vest needs to be adjusted.

The vest 20 can include buoyant materials to help a dog wearing the vest float. The vest 20 can also include heat-retaining material to keep a dog wearing the vest warmer and more comfortable.

What is claimed is:

1. A dog vest to be worn by a dog comprising:
    a back piece configured for covering at least a portion of a dog's back, and having left and right side panels for covering at least a portion of the dog's left and right sides, each of the left and right side panels having a hinged forward flap overlying a forward portion of its respective side panel, wherein the forward flap on the right side is hingedly attached to a forward edge of the right side panel and the forward flap on the left side is hingedly attached to a forward edge of the left side panel, and each of the left and right side panels having a hinged rearward flap overlying a rearward portion of its respective side panel, wherein the rearward flap on the right side is hingedly attached to a top edge of the right side panel and the rearward flap on the left side is hingedly attached to a top edge of the left side panel, where the forward flap and rearward flap on the left side do not overlap each other and the forward flap and the rearward flap on the right side do not overlap each other, and the underside of each flap and the portion of the side panel it overlies having mating halves of a hook-and-loop-type fastening material to releasably secure the flap over its respective portion of its respective side panel;
    a front piece configured for covering at least a portion of a dog's chest and belly, the front piece having left and right forward straps, the free end of the left forward strap adapted to be releasably engaged between the forward flap on the left side panel and the underlying portion of the left side panel, and the free end of the right forward strap adapted to be releasably engaged between the forward flap on the right side panel and the underlying portion of the right side panel; and left and right rearward tabs, the free end of the left rearward tab adapted to be releasably engaged between the rearward flap on the left side panel and the underlying portion of the left side panel, and the free end of the right rearward tab adapted to be releasably engaged between the rearward flap on the right side panel and the underlying portion of the right side panel.

2. The dog vest according to claim 1 wherein the back piece comprises left and right sections releasably joined along a center line extending parallel to the dog's spine, the left and right sections forming the left and right side panels, respectively.

3. The dog vest according to claim 2 wherein the portion of the free ends of the left and right forward straps facing the left and right side panels under the forward flaps have a mating half of the hook-and-loop-type fastening material to releasably engage the left and right side panels, respectively, and wherein the portion of the free ends of the left and right forward straps facing the undersides of the forward flaps on the left and right side panels have a mating half of the hook-and-loop-type fastening material to releasably engage the undersides of the forward flaps.

4. The dog vest according to claim 3 wherein the portion of the ends of the left and right rearward tabs facing the left and right side panels have a mating half of the hook-and-loop-type fastening material to releasably engage the left and right side panels, respectively, and wherein the portion of the free ends of the left and right rearward tabs facing the underside of the rearward flaps have a mating half of the hook-and-loop-type fastening material to releasably engage the undersides of the rearward flaps.

5. The dog vest according to claim 2 wherein the rearward flaps on the left and right side panels are hingedly mounted to the back piece parallel to the center line between the left and right sections.

6. The dog vest according to claim 2 wherein the left and right sections are releasably joined by a zipper.

7. The dog vest according to claim 1 wherein the portion of the free ends of the left and right forward straps facing the left and right side panels under the forward flaps have a mating half of the hook-and-loop-type fastening material to releasably engage the left and right side panels, respectively, and wherein the portion of the free ends of the left and right forward straps facing the undersides of the forward flaps on the left and right side panels have a mating half of the hook-and-loop-type fastening material to releasably engage the undersides of the forward flaps.

8. The dog vest according to claim 7 wherein the portion of the ends of the left and right rearward tabs facing the left and right side panels have a mating half of the hook-and-loop-type fastening material to releasably engage the left and right side panels, respectively, and wherein the portion of the free ends of the left and right rearward tabs facing the underside of the rearward flaps have a mating half of the hook-and-loop-type fastening material to releasably engage the undersides of the rearward flaps.

9. The dog vest according to claim 1 wherein the back piece is configured to overlie a dog's spine, and wherein the rearward flaps on the left and right side panels are hingedly mounted to the back piece parallel to the dog's spine.

10. The dog vest of claim 1, further comprising:
    a left pocket located between the forward flap and the rearward flap on the left side; and
    a right pocket located between the forward flap and the rearward flap on the right side.

11. A dog vest to be worn by a dog comprising:

a back piece configured for covering at least a portion of a dog's back, the back piece comprising left and right sections releasably joined along a centerline aligned with the dog's spine, the left and right sections forming left and right side panels for covering at least a portion of the dog's left and right sides, each of the left and right side panels having a hinged forward flap overlying a forward portion of its respective side panel, wherein the forward flap on the right side is hingedly attached to a forward edge of the right side panel and the forward flap on the left side is hingedly attached to a forward edge of the left side panel, and a hinged rearward flap overlying a rearward portion of its respective side panel, wherein the rearward flap on the right side is hingedly attached to a top edge of the right side panel and the rearward flap on the left side is hingedly attached to a top edge of the left side panel, where the forward flap and rearward flap on the left side do not overlap each other and the forward flap and the rearward flap on the right side do not overlap each other, and the underside of each flap and the portion of the side panel it overlies having mating halves of a hook-and-loop-type fastening material to releasably secure the flap over its respective portion of it respective side panel;

a front piece configured for covering at least a portion of the dog's chest and belly, the front piece having left and right forward straps, the free ends of which are adapted to be releasably engaged between the forward flap and the underlying portion of the side panel of the left and right side panels, respectively, the portion of the ends of the left and right forward straps facing the side panel under the forward flaps having a mating half of the hook-and-loop-type fastening material to releasably engage the left and right side panels, respectively, and the portion of the ends of the left and right forward straps facing the underside of the forward flaps having a mating half of the hook-and-loop-type fastening material to releasably engage the underside of the forward flaps on left and right side panels, respectively; and left and right rearward tabs, the free ends of which are adapted to be releasably engaged between the rearward flaps and the underlying portions of the side panel on the left and right side panels respectively, the portion of the ends of the left and right rearward tabs facing the side panel under the rearward flaps having a mating half of the hook-and-loop-type fastening material to releasably engage the left and right side panels, respectively, and wherein the portion of the ends of the left and right rearward tabs facing the underside of the rearward flaps having a mating half of the hook-and-loop-type fastening material to releasably engage the rearward flaps on left and right side panels, respectively.

12. The dog vest according to claim 11 wherein the rearward flaps on the left and right side panels are hingedly mounted to the back piece parallel to the center line between the left and right sections.

13. The dog vest of claim 11, further comprising:

a left pocket located between the forward flap and the rearward flap on the left side; and a right pocket located between the forward flap and the rearward flap on the right side.

* * * * *